United States Patent
Kanagaraj et al.

(10) Patent No.: US 12,391,182 B2
(45) Date of Patent: Aug. 19, 2025

(54) AUTO-SWITCH DISPLAY INTELLIGENT REARVIEW MIRROR SYSTEM

(71) Applicant: Panasonic Automotive Systems Company Of America, Division of Panasonic Corporation Of North America, Peachtree City, GA (US)

(72) Inventors: Padhu Kanagaraj, Farmington Hills, MI (US); Stephanie Tuttle, Walled Lake, MI (US); Rachel Anderson, Rochester Hills, MI (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 42 days.

(21) Appl. No.: 18/331,548

(22) Filed: Jun. 8, 2023

(65) Prior Publication Data

US 2023/0311766 A1 Oct. 5, 2023

Related U.S. Application Data

(63) Continuation of application No. 17/529,998, filed on Nov. 18, 2021, now Pat. No. 11,708,030, which is a
(Continued)

(51) Int. Cl.
*H01L 29/94* (2006.01)
*B60R 1/04* (2006.01)
(Continued)

(52) U.S. Cl.
CPC .................. *B60R 1/12* (2013.01); *B60R 1/04* (2013.01); *B60R 1/26* (2022.01); *H04N 7/188* (2013.01); *H04N 21/42204* (2013.01); *B60R 2001/1215* (2013.01); *B60R 2001/1253* (2013.01); *B60R 2300/70* (2013.01); *H04N 21/42206* (2013.01); *H04N 21/4532* (2013.01)

(58) Field of Classification Search
CPC .... B60R 1/12; B60R 1/04; B60R 1/26; B60R 2001/1215; B60R 2001/1253; B60R 2300/70; H04N 7/188; H04N 21/42204; H04N 21/42206; H04N 21/4532
See application file for complete search history.

(56) References Cited

U.S. PATENT DOCUMENTS

2001/0054989 A1* 12/2001 Zavracky ............. G02B 27/017
345/8
2010/0238105 A1* 9/2010 Matsushima ........ G09G 3/3648
345/102

(Continued)

*Primary Examiner* — Joseph Suh
(74) *Attorney, Agent, or Firm* — Laurence S. Roach, Esq.

(57) ABSTRACT

A motor vehicle includes a rearview mirror display system with a visible surface and having a mirror mode and a display mode. The visible surface functions as a mirror in the mirror mode. The visible surface displays an electronically produced image in the display mode. An electronic processor is communicatively coupled to the rearview mirror display system. The electronic processor detects that the display mode is not operating properly, and, in response to the detecting, automatically switches the rearview mirror display system from the display mode to the mirror mode.

20 Claims, 4 Drawing Sheets

Related U.S. Application Data continuation of application No. 16/788,987, filed on Feb. 12, 2020, now Pat. No. 11,208,042, which is a continuation of application No. 16/109,141, filed on Aug. 22, 2018, now Pat. No. 10,596,970.

(60) Provisional application No. 62/550,220, filed on Aug. 25, 2017.

(51) Int. Cl.

| | | |
|---|---|---|
| *B60R 1/12* | (2006.01) | |
| *B60R 1/26* | (2022.01) | |
| *H04N 7/18* | (2006.01) | |
| *H04N 21/422* | (2011.01) | |
| *H04N 21/45* | (2011.01) | |

(56) References Cited

U.S. PATENT DOCUMENTS

| | | | | |
|---|---|---|---|---|
| 2012/0257058 | A1* | 10/2012 | Kinoshita | G08G 1/165 |
| | | | | 348/148 |
| 2014/0114534 | A1* | 4/2014 | Zhang | H04N 23/81 |
| | | | | 701/42 |
| 2014/0217814 | A1* | 8/2014 | Namou | B60L 3/0092 |
| | | | | 307/10.1 |
| 2016/0185297 | A1* | 6/2016 | Boehm | B60R 1/12 |
| | | | | 348/148 |
| 2016/0257270 | A1* | 9/2016 | Teramoto | B60L 58/20 |
| 2017/0193969 | A1* | 7/2017 | Kimura | B60R 1/04 |
| 2017/0347067 | A1* | 11/2017 | Bostrom | G06V 20/59 |
| 2018/0229654 | A1* | 8/2018 | Unver | G06V 20/597 |
| 2018/0252978 | A1* | 9/2018 | Feng | B60R 1/12 |
| 2018/0262131 | A1* | 9/2018 | Russick | B63B 13/00 |
| 2019/0031105 | A1* | 1/2019 | Kim | B60R 1/081 |

* cited by examiner

AUTO-SWITCH DISPLAY INTELLIGENT REARVIEW MIRROR SYSTEM

CROSS-REFERENCE TO RELATED APPLICATION

This application is a continuation of U.S. patent application Ser. No. 17/529,998, filed Nov. 18, 2021, which is currently under allowance, which is a continuation of U.S. patent application Ser. No. 16/788,987, filed Feb. 12, 2020, which is Now U.S. Pat. No. 11,208,042, Issued on Dec. 28, 2021, which is a continuation of U.S. patent application Ser. No. 16/109,141, filed on Aug. 22, 2018, which is Now U.S. Pat. No. 10,596,970, Issued on Mar. 24, 2020, which claims benefit of U.S. Provisional Application No. 62/550,220 filed on Aug. 25, 2017, the disclosures of which are hereby incorporated by reference in their entireties for all purposes.

FIELD OF THE INVENTION

The disclosure relates to a rearview mirror system in a motor vehicle, and, more particularly, to an intelligent rearview mirror system in a motor vehicle.

BACKGROUND OF THE INVENTION

While driving a current motor vehicle, the driver glances at the rearview mirror to gain awareness of the situation behind the vehicle. The frequency and rate of the driver's glances in the rearview mirror are very high in order for the driver to maintain situational awareness in all safety-relevant areas, including the forward roadway, side view mirrors, and rearview mirror. In order for the driver to switch the mode of the rearview mirror display system between a display mode and a rearview mirror mode, the driver needs to press a button located on the bottom of the mirror. During the time it takes to switch modes, the driver's awareness and attention can be drawn away from the safety-relevant areas.

SUMMARY

The present invention may provide a rearview system in a vehicle including a mirror-display which may be mounted within the interior of the vehicle, and a camera to capture a rear scene behind the vehicle. A rearview camera may be mounted on the rear of the vehicle to capture the rear scene of the vehicle and may feed the video information to the rearview display. The user may manually switch back and forth from rearview mirror mode to display mode.

The invention may enable automatic switching between display mode and rearview mirror mode. When the rearview display system is not functioning optimally, the system may send a command to automatically switch to the rearview mirror mode. The automatic switching from the display mode to the rearview mirror mode may occur in response to a display pixel failure in a number of rows and/or columns that impair visibility, or in response to direct sunlight being sensed on the display, for example. When direct sunlight no longer impinges upon the display, the system may automatically switch from rearview mirror mode to display mode, unless the user has taken action to keep the system in rearview mirror mode. The automatic switching from the display mode to the rearview mirror mode may occur in response to a push button switch becoming damaged or stuck.

The invention may enable automatic switching from the display mode to the rearview mirror mode to enable the desired user experience in response to the vehicle being put in a Reverse gear position; the vehicle being put in a Park gear position; or the vehicle stopping at a signal light with a speed of less than five miles per hour. When these three conditions are no longer present, the system may automatically switch from rearview mirror mode to display mode, unless the user has taken action to keep the system in rearview mirror mode. In Drive gear, the system may switch to display mode.

The automatic switching from display mode to rearview mirror mode may be implemented by use of sensors and/or from detecting that the display module is in error mode. The rearview module may notify the driver/user via a popup message in the dash display and/or an LED status indicator (e.g., a red blinking LED) indicating that the display mode has been switched to the rearview mirror mode. If the user attempts to switch back from the rearview mirror mode to the display mode, an error message may be displayed.

Auto-switching the rearview mirror display system from the display mode to the rearview mirror mode after failure of the display mode relieves the user of the task of changing the mode manually, and reduces the time that the user would have spent in recognizing the problem and identifying a solution to regain awareness of the situation behind the vehicle. In summary, auto-switching the rearview mirror display system mode during failure removes the troubleshooting task from the user.

Auto-switching the rearview mirror display system mode may also solve the user experience issue of having to consistently change the mirror mode in certain scenarios. For example, users may prefer to use the mirror while in park gear to look at themselves or at rear seat passengers. Users may also prefer to use the mirror while in reverse gear to control their view with the motion of their head and eyes in conjunction with the rearview back-up camera display.

In one embodiment, the invention comprises a motor vehicle including a rearview mirror display system with a visible surface and having a mirror mode and a display mode. The visible surface functions as a mirror in the mirror mode. The visible surface displays an electronically produced image in the display mode. An electronic processor is communicatively coupled to the rearview mirror display system. The electronic processor detects that the display mode is not operating properly, and, in response to the detecting, automatically switches the rearview mirror display system from the display mode to the mirror mode.

In another embodiment, the invention comprises a motor vehicle rearview mirror display method including providing a rearview mirror display system with a visible surface, a mirror mode and a display mode. The visible surface is operated as a mirror in the mirror mode. The visible surface is used to display an electronically produced image in the display mode. It is detected that the display mode is not operating properly. In response to the detecting, the rearview mirror display system is automatically switched from the display mode to the mirror mode.

In yet another embodiment, the invention includes a motor vehicle having a rearview camera capturing images of a scene behind the motor vehicle. A rearview mirror display system includes a visible surface and has a mirror mode and a display mode. The visible surface functions as a mirror in the mirror mode. The visible surface displays images captured by the rearview camera in the display mode. An electronic processor is communicatively coupled to the rearview mirror display system. The electronic processor detects that the display mode is not operating properly, and, in response to the detecting, automatically switches the rearview mirror display system from the display mode to the mirror mode.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
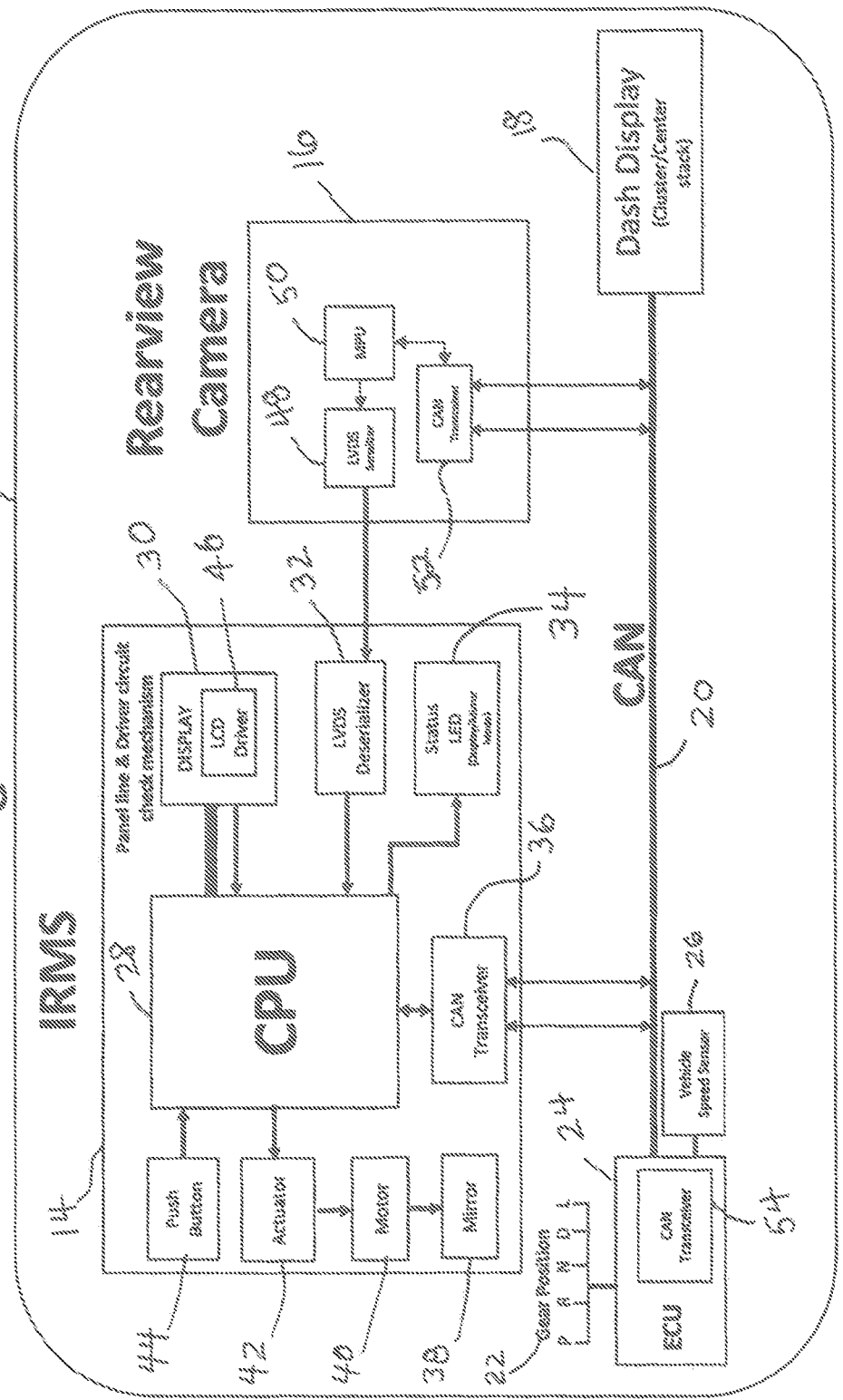
FIG. 1 is a block diagram of one embodiment of a vehicular rearview mirror display arrangement of the present invention.

FIG. 1 illustrates one embodiment of a vehicular rearview mirror display arrangement 10 of the present invention for a motor vehicle 12. Arrangement 10 includes an intelligent rearview mirror system (IRMS) 14, a rearview camera 16, a dash display 18, a controller area network (CAN) bus 20, a gear position control 22, an engine control unit 24 and a vehicle speed sensor 26.

IRMS 14 includes a central processing unit (CPU) 28, a display screen 30, a low-voltage differential signaling (LVDS) deserializer 32, a status LED 34, a CAN transceiver 36, a mirror 38, a motor 40, an actuator 42, and a pushbutton 44. Display screen 30 may be disposed adjacent a midpoint of a top edge of the windshield, in approximately the same space in which a conventional rearview mirror may be disposed. Display screen 30 includes an LCD driver 46 and a panel line and driver circuit check mechanism (not shown). Status LED 34 may indicate whether arrangement 10 is in a display mode or a rearview mirror mode. CAN transceiver 36 interconnects CPU 28 and CAN bus 20. CPU 28 may control the orientation of mirror 38 by transmitting signals to actuator 42, and actuator 42, in turn, may control motor 40 based on the signals. Motor 40 may thereby move mirror 38 to the desired orientation.

Rearview camera 16 includes an LVDS serializer 48, an MPU motion tracking device 50, and a CAN transceiver 52 which interconnects device 50 and CAN bus 20.

Dash display 18 may be located on the instrument cluster or on the center stack.

ECU 24 includes a CAN transceiver 54 which interconnects ECU 24 and CAN bus 20.

Figure 2:
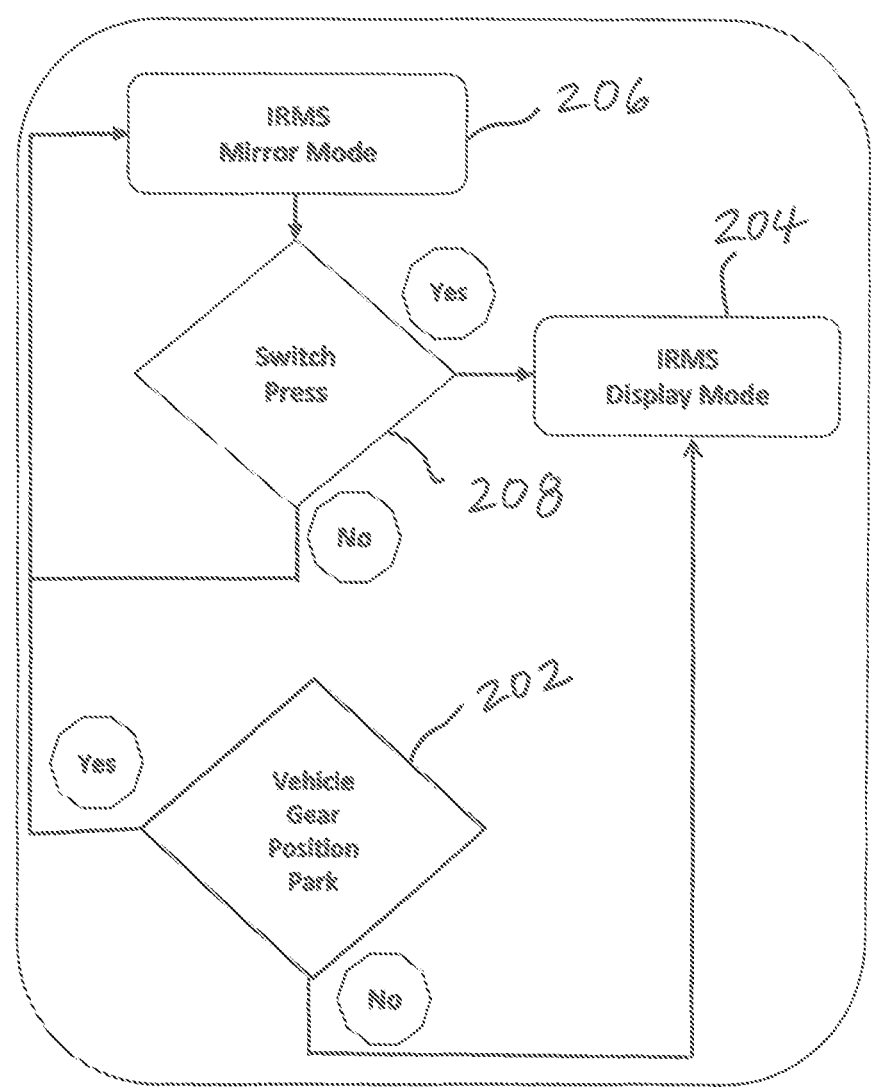
FIG. 2 is a flow chart of one embodiment of a vehicular rearview mirror display method of the present invention.

FIG. 2 illustrates one embodiment of a vehicular rearview mirror display method 200 of the present invention. In a first step 202, it is determined whether the vehicle's gear position is in Park or Neutral. If not, then in step 204 the system goes into IRMS display mode. On the other hand, if it is determined in step 202 that the vehicle is in the Park or Neutral gear positions, then in step 206 the system goes into IRMS rearview mirror mode.

If the system has gone into IRMS rearview mirror mode, then in step 208 it is determined whether the user has pressed a switch, such as pushbutton 44. If the user has pressed the switch, then in step 204 the system goes into IRMS display mode. On the other hand, if it is determined in step 208 that the user has not pressed the switch, then in step 206 the system goes into IRMS rearview mirror mode.

There may be automatic switching from the display mode to the rearview mirror mode in response to the vehicle being put in a Reverse gear position; the vehicle being put in a Park gear position; or the vehicle stopping at a signal light with a speed of less than five miles per hour. When these three conditions are no longer present, the system may automatically switch from rearview mirror mode to display mode, unless the user has taken action to keep the system in rearview mirror mode. In Drive gear, the system may switch to display mode.

Figure 3:
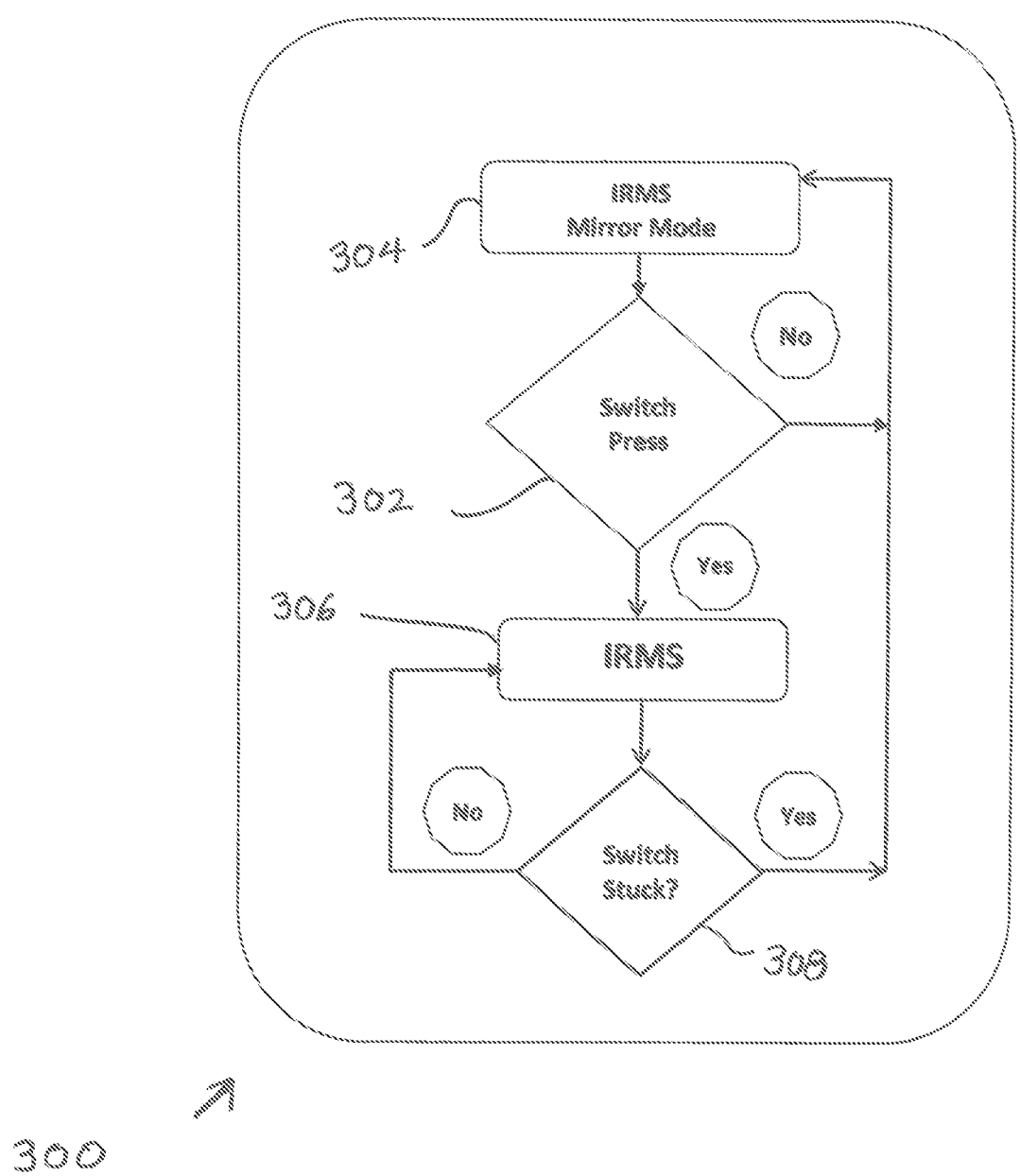
FIG. 3 is a flow chart of another embodiment of a vehicular rearview mirror display method of the present invention.

FIG. 3 illustrates another embodiment of a vehicular rearview mirror display method 300 of the present invention. In a first step 302, it is determined whether the user has pressed a switch, such as pushbutton 44. If the user has not pressed the switch, then in step 304 the system goes into IRMS rearview mirror mode. On the other hand, if it is determined in step 302 that the user has pressed the switch, then in step 306 the system goes into IRMS display mode.

In a next step 308, it is determined whether the switch is stuck and is thus malfunctioning. If the switch is stuck, then in step 304 the system goes into IRMS rearview mirror mode. On the other hand, if it is determined in step 308 that the switch is not stuck, then in step 306 the system goes into IRMS display mode.

Figure 4:
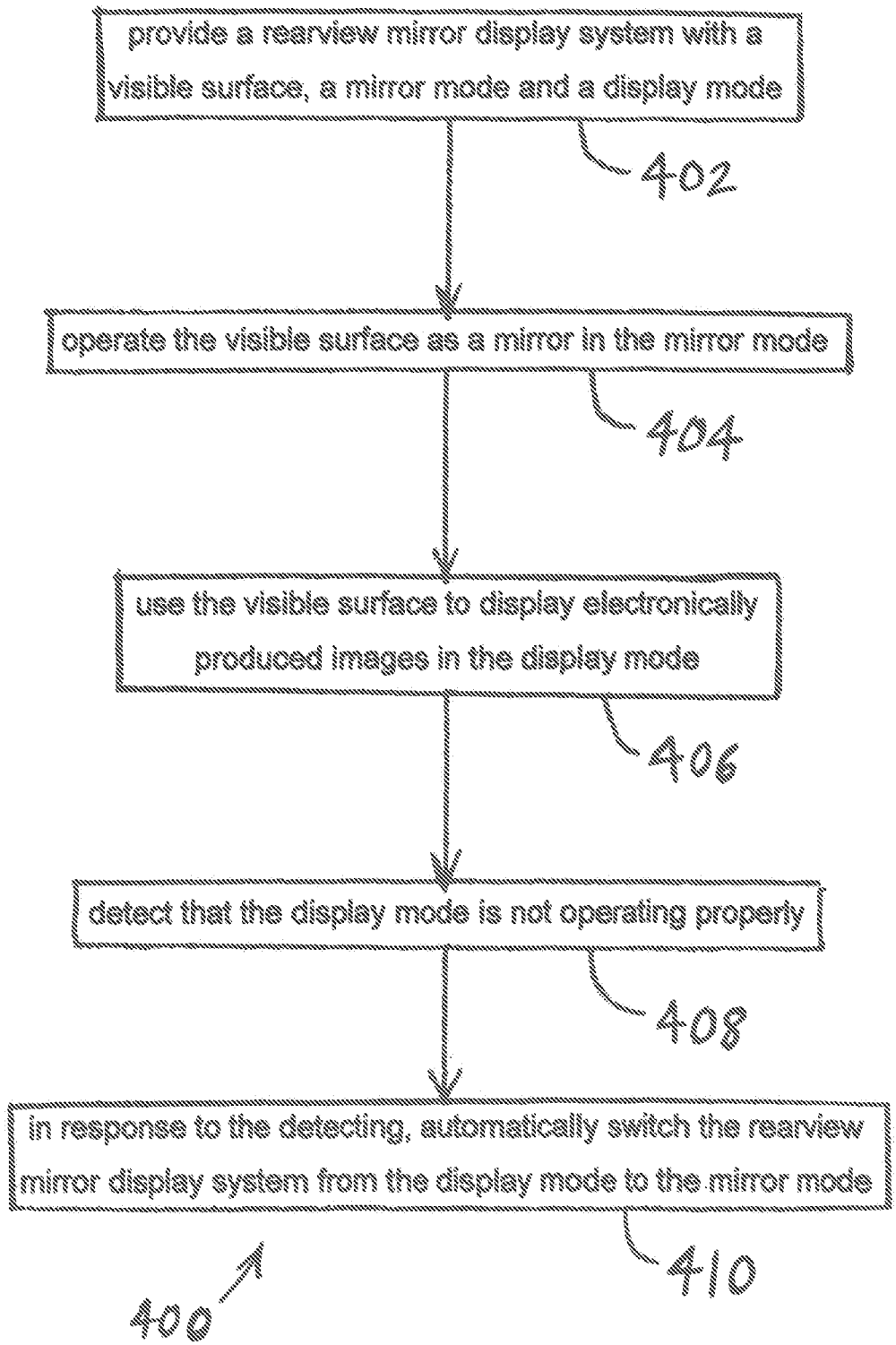
FIG. 4 is a flow chart of yet another embodiment of a vehicular rearview mirror display method of the present invention.

FIG. 4 illustrates yet another embodiment of a vehicular rearview mirror display method 400 of the present invention for a motor vehicle. In a first step 402, a rearview mirror display system is provided with a visible surface, a mirror mode and a display mode. For example, IRMS 14 includes a visible display screen 30 and has a mirror mode wherein screen 30 functions as a mirror, and a display mode wherein screen 30 presents an electronically produced image.

Next, in step 404, the visible surface is operated as a mirror in the mirror mode. That is, display screen 30 may function as a conventional automotive rearview mirror.

In a next step 406, the visible surface is used to display electronically produced images in the display mode. That is, display screen 30 may function as a display screen to present images that may be produced and provided by CPU 28.

In step 408, it is detected that the display mode is not operating properly. For example, CPU 28 may receive a signal from display screen 30 indicating that display screen 30 is operating in an error mode.

In a final step 410, in response to the detecting, the rearview mirror display system is automatically switched from the display mode to the mirror mode. For example, in response to receiving a signal from display screen 30 indicating that display screen 30 is operating in an error mode, CPU 28 may automatically switch IRMS 14 from the display mode to the mirror mode.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detail description is given primarily for clearness of understanding and no unnecessary limitations are to be understood therefrom for modifications can be made by those skilled in the art upon reading this disclosure and may be made without departing from the spirit of the invention.

What is claimed is:

1. A vehicular rearview mirror display arrangement comprising:
   a rearview mirror display system including a visible surface and having a mirror mode and a display mode, the visible surface functioning as a mirror in the mirror mode, the visible surface displaying electronically produced images in the display mode; and
   an electronic processor communicatively coupled to the rearview mirror display system, the electronic processor being configured to:
      ascertain that a motor vehicle is traveling at less than a threshold speed; and
      in response to the ascertaining, automatically switch the rearview mirror display system from the display mode to the mirror mode.

2. The arrangement of claim 1 further comprising a user-actuatable switch, the electronic processor being configured to switch the rearview mirror display system from the mirror mode to the display mode in response to a user actuating the switch.

3. The arrangement of claim 1 further comprising an image capturing device communicatively coupled to the electronic processor and configured to capture images of a scene behind the motor vehicle, wherein the electronically produced images displayed by the visible surface in the display mode are based on images captured by the image capturing device.

4. The arrangement of claim 1 further comprising a user-actuatable switch configured to enable a user to switch the rearview mirror display system back and forth between the mirror mode and the display mode.

5. The arrangement of claim 4 wherein the electronic processor is configured to:
   establish that the switch is inoperative; and
   in response to the establishing, automatically switch the rearview mirror display system from the display mode to the mirror mode.

6. The arrangement of claim 4 wherein the electronic processor is configured to:
   establish that the switch is stuck; and
   in response to the establishing, automatically switch the rearview mirror display system from the display mode to the mirror mode.

7. The arrangement of claim 1 further comprising a rearview camera, the electronically produced images having been captured by the rearview camera.

8. The arrangement of claim 1 wherein the electronic processor is configured to:
   detect that the display mode is not operating properly; and
   in response to the detecting, automatically cease operating the rearview mirror display system in the display mode.

9. A rearview mirror display method for a motor vehicle comprises:
   providing a rearview mirror display system with a visible surface, a mirror mode and a display mode;
   operating the visible surface as a mirror in the mirror mode;
   using the visible surface to display electronically produced images in the display mode;
   ascertaining that the motor vehicle is traveling at less than a threshold speed; and
   in response to the ascertaining, automatically switching the rearview mirror display system from the display mode to the mirror mode.

10. The method of claim 9 further comprising capturing images of a scene behind the motor vehicle, wherein the electronically produced images displayed by the visible surface in the display mode are based on the images captured of the scene behind the motor vehicle.

11. The method of claim 9 further comprising:
   providing the motor vehicle with a user-actuatable switch to switch the rearview mirror display system from the mirror mode to the display mode in response to a user actuating the switch;
   establishing that the switch is inoperative; and
   in response to the establishing, automatically switching the rearview mirror display system from the display mode to the mirror mode.

12. The method of claim 9 further comprising:
   detecting that the display mode is not operating properly; and
   in response to the detecting, automatically operating the rearview mirror display system in the mirror mode.

13. A vehicular rearview mirror display arrangement comprising:
   a rearview mirror display system including a visible surface and having a first mode and a display mode, the visible surface functioning as a mirror in the first mode, the visible surface functioning other than as a mirror in the display mode; and
   an electronic processor communicatively coupled to the rearview mirror display system, the electronic processor being configured to:
      ascertain that a motor vehicle is traveling at less than a threshold speed; and
      in response to the ascertaining, automatically switch the rearview mirror display system from the display mode to the first mode.

14. The arrangement of claim 13 further comprising a user-actuatable switch, the electronic processor being configured to switch the rearview mirror display system from the first mode to the display mode in response to a user actuating the switch.

15. The arrangement of claim 13 further comprising an image capturing device communicatively coupled to the electronic processor and configured to capture images of a scene behind the motor vehicle, wherein electronically produced images displayed by the visible surface in the display mode are based on images captured by the image capturing device.

16. The arrangement of claim 13 further comprising a user-actuatable switch configured to enable a user to switch the rearview mirror display system back and forth between the first mode and the display mode.

17. The arrangement of claim 16 wherein the electronic processor is configured to:
   establish that the switch is inoperative; and
   in response to the establishing, automatically switch the rearview mirror display system from the display mode to the first mode.

18. The arrangement of claim 16 wherein the electronic processor is configured to:
   establish that the switch is stuck; and
   in response to the establishing, automatically switch the rearview mirror display system from the display mode to the first mode.

19. The arrangement of claim 13 further comprising a rearview camera, wherein electronically produced images captured by the rearview camera are displayed by the visible surface in the display mode.

20. The arrangement of claim 13 wherein the electronic processor is configured to:
    detect that the display mode is not operating properly; and
    in response to the detecting, automatically cease operating the rearview mirror display system in the display mode.

* * * * *